United States Patent
Amesbury et al.

(10) Patent No.: US 7,538,295 B2
(45) Date of Patent: May 26, 2009

(54) LASER WELDING SYSTEM

(75) Inventors: Marjan S. Amesbury, Albany, OR (US); Barbara Helen Baxter, Corvallis, OR (US); Michael O. King, Albany, OR (US); Mark T. Hardin, Philomath, OR (US); Qiong Chen, Singapore (SG); Muay Kheng Neo, Singapore (SG); Louis-Raymond Rozario, Singapore (SG)

(73) Assignee: Hewlett-Packard Development Company, L.P., Houston, TX (US)

( * ) Notice: Subject to any disclaimer, the term of this patent is extended or adjusted under 35 U.S.C. 154(b) by 678 days.

(21) Appl. No.: 11/111,540

(22) Filed: Apr. 21, 2005

(65) Prior Publication Data

US 2006/0237401 A1 Oct. 26, 2006

(51) Int. Cl.
*B23K 26/24* (2006.01)

(52) U.S. Cl. ............................. 219/121.63; 219/121.76; 156/272.8

(58) Field of Classification Search ............. 219/121.63, 219/121.64, 121.73, 121.82; 156/272.8, 156/580
See application file for complete search history.

(56) References Cited

U.S. PATENT DOCUMENTS

| | | | |
|---|---|---|---|
| 3,424,890 A | 1/1969 | Van Ruyven | |
| 3,619,809 A * | 11/1971 | Ozzimo et al. | 372/34 |
| 4,914,272 A | 4/1990 | Ito et al. | |
| 5,142,120 A * | 8/1992 | Hanson et al. | 219/121.83 |
| 5,185,758 A | 2/1993 | Fan et al. | |
| 5,389,954 A * | 2/1995 | Inaba et al. | 347/258 |
| 5,705,788 A * | 1/1998 | Beyer et al. | 219/121.62 |
| 5,802,092 A | 9/1998 | Endriz | |
| 5,829,125 A | 11/1998 | Fujimoto et al. | |
| 5,861,603 A | 1/1999 | Miyachi et al. | |
| 5,861,992 A * | 1/1999 | Gelbart | 359/619 |
| 5,886,313 A * | 3/1999 | Krause et al. | 219/121.6 |
| 6,102,552 A | 8/2000 | Tullis et al. | |
| 6,390,853 B2 | 5/2002 | Evers | |
| 6,394,158 B1 | 5/2002 | Momeni | |
| 6,417,481 B2 | 7/2002 | Chen et al. | |
| 6,465,757 B1 | 10/2002 | Chen | |
| 6,486,433 B2 * | 11/2002 | Grewell et al. | 219/121.63 |
| 6,643,311 B2 * | 11/2003 | Krupke | 372/56 |
| 6,770,838 B1 * | 8/2004 | Clement et al. | 219/121.61 |
| 6,773,142 B2 * | 8/2004 | Rekow | 362/259 |

(Continued)

FOREIGN PATENT DOCUMENTS

DE 10339636 A1 3/2005

(Continued)

*Primary Examiner*—Samuel M Heinrich

(57) ABSTRACT

A laser welding system includes a free-spacing beam delivery laser head having a linear array of at least two laser diodes. Each of the diodes generates a laser beam of a predetermined wavelength and spectral width, the laser beams adapted to weld a workpiece having a first component and at least one other component to be welded to the first component, the first component being substantially transmissive to the wavelength, the other component being substantially absorptive of the wavelength. A lens is spaced a predetermined distance from each of the laser diodes, each of the lenses adapted to focus the respective laser beam into a focused laser beam segment, thereby forming a continuous line of laser energy from a substantially serial combination of each focused laser beam segment. The continuous line of laser energy is in a plane containing the workpiece, and is substantially orthogonal to the workpiece translation direction.

14 Claims, 4 Drawing Sheets

U.S. PATENT DOCUMENTS

| | | |
|---|---|---|
| 6,796,636 B2 | 9/2004 | Kwan et al. |
| 6,811,250 B2 | 11/2004 | Buchanan et al. |
| 6,919,634 B2 * | 7/2005 | Kuramoto et al. ........... 257/738 |
| 6,987,240 B2 * | 1/2006 | Jennings et al. .......... 219/121.8 |
| 2001/0019045 A1 * | 9/2001 | Chen et al. ............. 219/121.73 |
| 2003/0016450 A1 * | 1/2003 | Bluemel et al. ............. 359/618 |
| 2004/0065406 A1 | 4/2004 | Chen et al. |
| 2004/0080573 A1 | 4/2004 | Buchanan et al. |
| 2004/0091013 A1 * | 5/2004 | Yamaguchi et al. ......... 372/108 |
| 2004/0095444 A1 | 5/2004 | Drummond et al. |
| 2004/0095448 A1 | 5/2004 | Buchanan et al. |
| 2004/0137700 A1 * | 7/2004 | Sekiya ....................... 438/460 |
| 2004/0150688 A1 | 8/2004 | Kwan et al. |
| 2004/0231788 A1 | 11/2004 | Chen et al. |
| 2005/0047971 A1 | 3/2005 | Clements et al. |
| 2005/0145330 A1 * | 7/2005 | Shubinsky et al. ........ 156/272.8 |

FOREIGN PATENT DOCUMENTS

| | | |
|---|---|---|
| EP | 045158 | 7/1992 |
| EP | 1113543 | 7/2001 |
| JP | 402143150 A * | 6/1990 |
| JP | 404361260 A * | 12/1992 |
| JP | 407176473 A * | 7/1995 |
| JP | 408045798 A * | 2/1996 |
| JP | 411277280 A * | 10/1999 |
| WO | 00/66345 A1 | 9/2000 |

* cited by examiner

LASER WELDING SYSTEM

BACKGROUND

The present disclosure relates generally to laser welding, and more particularly to an apparatus for laser welding.

Laser welding is a fusion welding process, where materials are joined by melting or softening the interface between the parts to be joined and allowing it to solidify. An intense beam of laser radiation is focused onto the material to be joined. The radiation excites a resonant frequency in the molecules of the parts to be joined, resulting in heating of the material. The radiation produced by laser diodes may be used to weld plastic parts, but the power associated with a single laser diode may, in some instances, be insufficient to melt the material to be joined quickly and efficiently. Some laser welding devices combine the output of a number of laser diodes to produce quick heating of a large area of the material to be joined. One method for combining the laser radiation from a bank of laser diodes is to use optical fibers to transmit the laser radiation to adjacent locations to produce sufficient radiation density for welding. The flexibility of optical fibers may be advantageous in applications where welding is desired in three spatial dimensions.

The bank of lasers of one laser welding system contains 15 individual 50 Watt laser diodes for a combined power of 750 Watts. The laser diodes specified in the bank of lasers each produce continuous laser radiation at a wavelength of 808 nm with a spectral width less than 2.5 nm. The relatively tight spectral width may be advantageous when using the lasers as a bumping source for solid state lasers, however a tight spectral width generally corresponds to low energy gain efficiency in laser diodes.

Depending upon the application, there may be a relatively high cost of maintenance for both diode lasers and the optical fiber array. In a mass production environment, there may be a significant cost of down time if any of the 15 laser diodes or optical fibers requires realignment or maintenance. The mean time between maintenance (MTBM) of the system is generally shorter because of the relatively large number of components. Another possible drawback to an optical fiber array is the potentially high loss of energy during beam transportation through the fiber(s).

Further, some laser welding devices prevent melting of portions of the parts to be welded by blocking the laser beam from irradiating the protected area with a mask that absorbs and reflects the laser energy. However, a drawback exists in that the mask may be ablated or eroded by the laser energy and may require replacement or refurbishment after a relatively short time in service.

Thus, it would be desirable to provide an apparatus for laser welding that substantially overcomes the above drawbacks by providing an apparatus that has a longer mean time between maintenance (MTBM), lower initial capital cost, and more energy efficient operation.

SUMMARY

A laser welding system includes a free-spacing beam delivery laser head having a linear array of at least two laser diodes. Each of the diodes is adapted to generate a laser beam of a predetermined wavelength and spectral width, the laser beams adapted to weld a workpiece having a first component and at least one other component to be welded to the first component, the first component being substantially transmissive to the wavelength, the other component being substantially absorptive of the wavelength. A lens is spaced a predetermined distance from each of the laser diodes, each of the lenses adapted to focus the respective laser beam into a focused laser beam segment, thereby forming a continuous line of laser energy from a substantially serial combination of each focused laser beam segment. The continuous line of laser energy is in a plane containing the workpiece, and is substantially orthogonal to the workpiece translation direction.

BRIEF DESCRIPTION OF THE DRAWINGS

Objects, features and advantages of embodiments of the present disclosure will become apparent by reference to the following detailed description and drawings, in which like reference numerals correspond to similar, though not necessarily identical components. For the sake of brevity, reference numerals having a previously described function may not necessarily be described in connection with other drawings in which they appear.

DETAILED DESCRIPTION

It has been unexpectedly and fortuitously discovered that the laser welding system(s) of the present disclosure have a longer mean time between maintenance (MTBM), relatively low initial capital cost, and more energy efficient operation.

Figure 1:
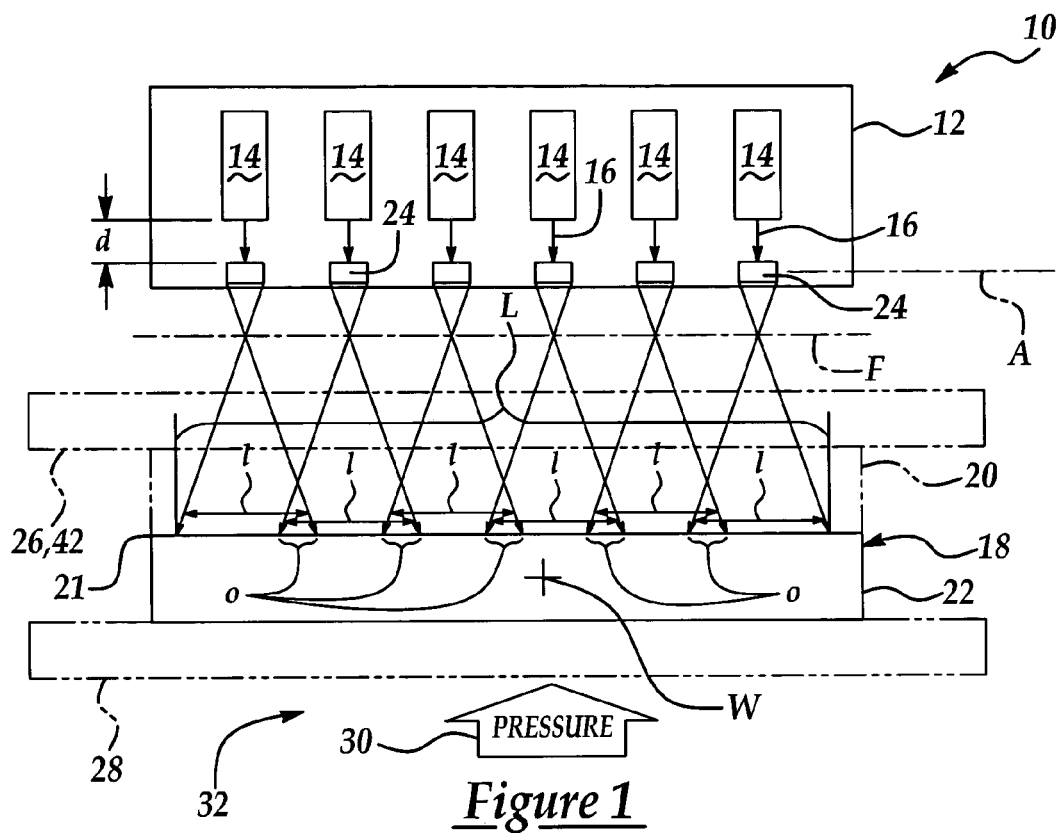
FIG. 1 is schematic view of an embodiment of a laser welding system including a free-spacing beam delivery laser head.

Referring now to FIG. 1, in an embodiment, a laser welding system is designated generally at 10. Laser welding system 10 includes a free-spacing beam delivery laser head 12 having a linear array of at least two laser diodes 14 therein. In the figure, a linear array of six laser diodes 14 forming a substantially horizontal 1×6 laser diode stack is shown; however, it is to be understood that any suitable number of laser diodes 14 may be used, as desired and/or as suitable for a particular application. In an embodiment, the laser head 12 has an output power of about 480 Watts/6 diodes.

The term "free-spacing beam delivery" as used herein is broadly construed as meaning that the laser beams 16 are not directed through fiber optics, fiber optic bundles, or the like.

Each of the diodes 14 is adapted to generate a continuous wave laser beam 16 of a predetermined wavelength and spectral width. The laser beams 16 are adapted to weld a workpiece 18 having a first component 20 and at least one other component(s) 22 to be welded to the first component 20. The first component 20 is substantially transmissive to the predetermined wavelength; and the other component 22 is substantially absorptive of the predetermined wavelength. It is to be understood that the term "transmissive" or "substantially transmissive" as used herein is not intended to mean 100% transmissive. A material which transmits from about 75% up to about 100% of the light energy may be suitable for use in the present embodiments. Further, it is to be understood that the term "absorptive" or "substantially absorptive" as used herein is meant to mean a material which absorbs substantially all (for example about 90% of the light within about 0.2 mm of the interface 21 between components 20 and 22) of the light energy which it does not reflect.

It is to be understood that any suitable polymeric materials may be used for components 20 and 22, provided that component 20 is substantially transmissive, and component 22 is substantially absorptive. In an embodiment, the materials used for either component 20 or 22 are the following suitably modified (i.e. formulating the materials to have the desired optical properties) materials: at least one of acrylonitrilebutadiene styrene (ABS), polypropylene (PP), polyethylene terephthalate (PET), glycol modified polyethylene terephthalate (PETG), polyphenylene oxide (PPO), liquid crystal polymer (LCP), and mixtures thereof.

In an embodiment, component 20 is formed from the following materials modified to be substantially transmissive: at least one of acrylonitrilebutadiene styrene (ABS), polypropylene (PP), polyethylene terephthalate (PET), PETG, polyphenylene oxide (PPO), and mixtures thereof.

In a further embodiment, component 22 is formed from the following materials modified to be substantially absorptive: at least one of acrylonitrilebutadiene styrene (ABS), polypropylene (PP), polyethylene terephthalate (PET), polyphenylene oxide (PPO), liquid crystal polymer (LCP), and mixtures thereof.

A lens 24 is spaced a predetermined distance d from each of the laser diodes 14, as shown. It is to be understood that the distance d may be any suitable distance as desired and/or as suitable for a particular application; however, in an embodiment, distance d ranges from about 0.32 cm (⅛ inch) to about 5.1 cm (2 inches).

The axis A of lenses 24 is substantially orthogonal to the direction W (discussed further below) of workpiece 18 translation. In an embodiment, each lens 24 is a cylindrical focusing lens adapted to adjust the respective laser beam 16 density and substantially reduce beam divergence. Such reduction of beam divergence may be by any desired amount. In an embodiment, this beam divergence is +/− about 1 mm to about 5 mm. Each of the lenses 24 is adapted to focus the respective laser beam 16 into a focused laser beam segment 1, after passing through focal plane F, thereby forming a continuous line of laser energy L from a substantially serial combination of each focused laser beam segment 1, as shown. In an embodiment, there may be a predetermined amount of overlap o between each of adjacent laser beam segments 1. It is to be understood that overlap o may be any suitable amount, as desired. A suitable amount of overlap o may range from about 0% to about 50% of the length of line segment 1. A further example of a suitable amount of overlap is about 10% of the length of line segment 1. Alternately, the segments 1 may be touching substantially without any overlap o to form continuous line L. Further, in one line L there may be a combination of overlapping segments 1 and touching segments 1.

The continuous line of laser energy L is generally in a plane containing the workpiece 18, and is substantially orthogonal to a direction W of translation of the workpiece. As shown in FIG. 1, direction W is into/out of the page. In a further embodiment, the continuous line of laser energy L is in a plane containing the interface 21 between the first component 20 and the other component 22 (as shown).

The system 10 may further include a workpiece positioning member 28 and/or translating member 32, generally in conjunction with a suitable lift fixture 30 at a predetermined pressure (discussed further below), adapted to substantially continuously place consecutive adjacent areas of the workpiece 18 to be welded a predetermined distance from the laser head 12 for a predetermined period of time. The amount of time workpiece 18 is subjected to line L (or laser energy 38 in the embodiment of FIG. 2) may be any suitable amount of time; in an embodiment, such time may range from about 1 second to about 50 seconds. It is to be understood that the distance from workpiece 18 to laser head 12 may be varied, depending upon the rate of overlap o (if any) desired between adjacent laser beam segments 1. In one embodiment, the distance between laser head 12 and workpiece 18 is about 17.8 cm (7 inches) for an overlap o of about 10% of the length of one laser beam segment 1. In a further embodiment, the distance between laser head 12 and workpiece 18 ranges between about 0.32 cm (⅛ inch) and about 25.4 cm (10 inches).

The speed at which workpiece 18 is passed under line L (or laser energy 38 in the embodiment of FIG. 2) may also be any suitable speed sufficient to substantially uniformly weld components 20, 22. It is to be understood that the speed at which workpiece 18 is passed under line L/laser energy 38 and the number of passes may be determined by considering the following factors (among other factors): the melt point temperature of the materials used for components 20, 22 and the desired joint collapse depth. In an embodiment, such speed may range between about 8 mm/sec and about 50 mm/sec, and passes may range from about 1 to about 5. In an embodiment where the workpiece 18 is passed under line L/laser energy 38 twice, the speed is about 19 mm/sec.

It is to be understood that the continuous line of laser energy L/laser energy 38 may have any wavelength suitable to weld the materials of which components 20, 22 are formed. In an embodiment, the continuous wave (CW) wavelength of the laser beams 16 emitted by diodes 14, and thus the wavelength of line L ranges between about 780 nm CW and about 840 nm CW (this is the range of transmission through component 20 and absorption by component 22). In a further embodiment, this wavelength is about 808 nm CW. The spectral width of the beams 16/line L may be less than about 10 nm. In an embodiment, the spectral width ranges from about 5 nm to about 7 nm. It has been unexpectedly and advantageously found that, by choosing materials of which components 20, 22 are formed to have relatively broad absorption, the spectral width may be relaxed to the parameters mentioned immediately above. Thus, relatively less expensive and more reliable diode lasers 14 may be used in the embodiments 10, 100 of FIGS. 1 and 2, respectively.

In an embodiment, the first component 20 and the other component 22 are each formed from at least one polymeric material, provided that such material(s) are transmissive or absorptive, respectively, of the wavelength of line L. The workpiece 18 is adapted to be welded by partially melting and softening material adjacent the interface 21 between the first component 20 and the other component 22, and allowing the materials adjacent the interface 21 to solidify, thereby forming the workpiece 18 of welded components 20, 22.

Laser welding system 10 may further include an upper pressure plate 26 (one example of which is a water cooled pressure plate 42) operatively disposed between the lenses 24 and the first component 20 of the workpiece 18. It is to be understood that the water cooled pressure plate 42 may be used in either the embodiment discussed above in relation to FIG. 1, or with the embodiment discussed below in relation to FIG. 2. Details of the water cooled pressure plate 42 will be discussed below in relation to FIGS. 6 and 7.

Figure 2:
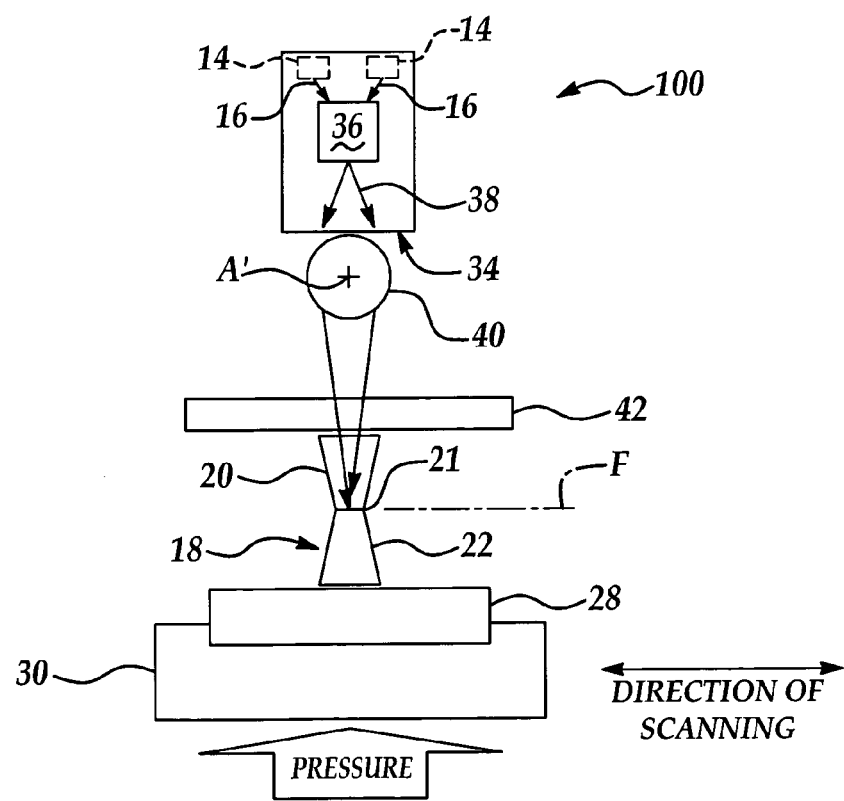
FIG. 2 is a schematic view of an alternate embodiment of a laser welding system including a fiber optic bundle.

Referring now to FIG. 2, an alternate embodiment of a laser welding system is designated generally (and schematically shown) at 100. System 100 includes at least two diode lasers 14 adapted to generate a continuous wave laser beam 16, each beam 16 being directed through at least one fiber optic bundle 36 to a laser weld head 34, the laser beam exiting the weld head 34 being arranged in a substantially straight line array of laser energy 38. At least one lens 40 (for example, a cylindrical lens) having an axis at A' (into/out of the page, as depicted in the figure) is adapted to focus the substantially straight line array 38 onto a workpiece 18. The focal plane F is substantially at interface 21, the focal plane F and straight line array 38 being substantially orthogonal to the direction of scanning of workpiece W.

It is to be understood that the workpiece 18 with components 20, 22 and interface 21, as well as the positioning member 28 and lift fixture 30, are as described hereinabove in relation to FIG. 1.

Laser welding system 100 further includes a water-cooled, heat conducting, masked pressure plate 42 operatively disposed between the lens 40 and the first component 20 (or between lenses 24 and first component 20 with the embodiment of FIG. 1) and adapted to selectively block transmission of the straight line array of laser energy 38 (or the continuous line of laser energy L when used in conjunction with the embodiment of FIG. 1), thereby substantially preventing undesired heating of the workpiece 18 (for example, in areas of the workpiece 18 where welding is undesirable).

Figure 3:
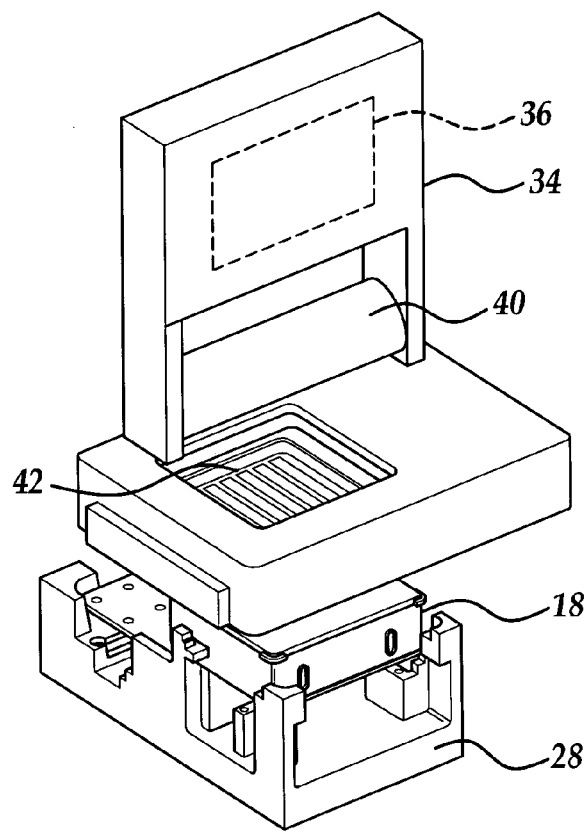
FIG. 3 is an enlarged, semi-schematic perspective view of the embodiment of FIG. 2, and showing a water cooled masked pressure plate.
Figure 4:
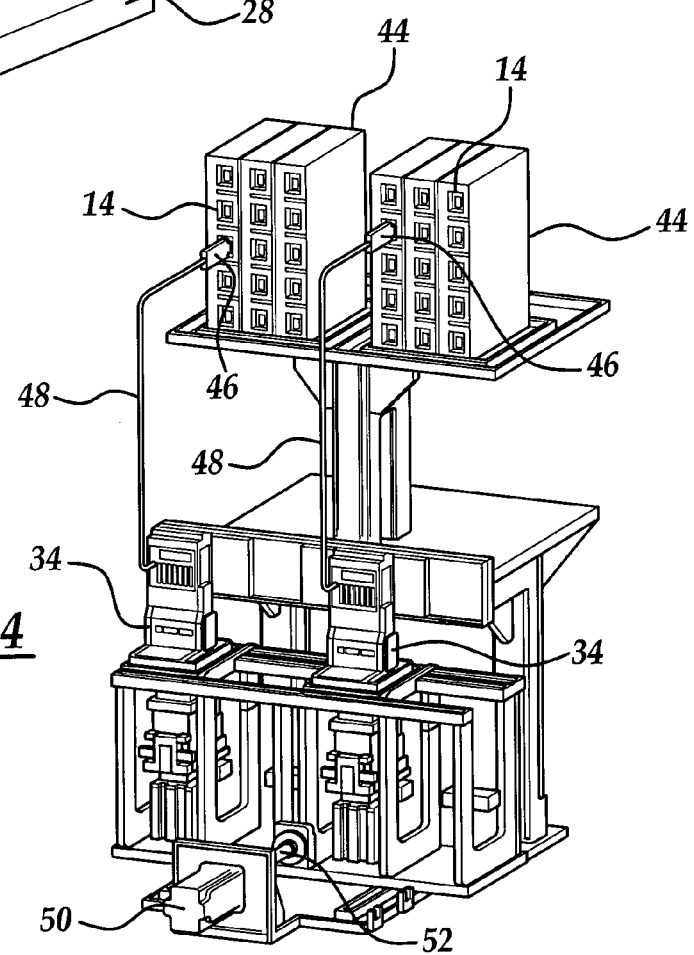
FIG. 4 is a semi-schematic perspective view of the embodiment of FIG. 2.
Figure 5:
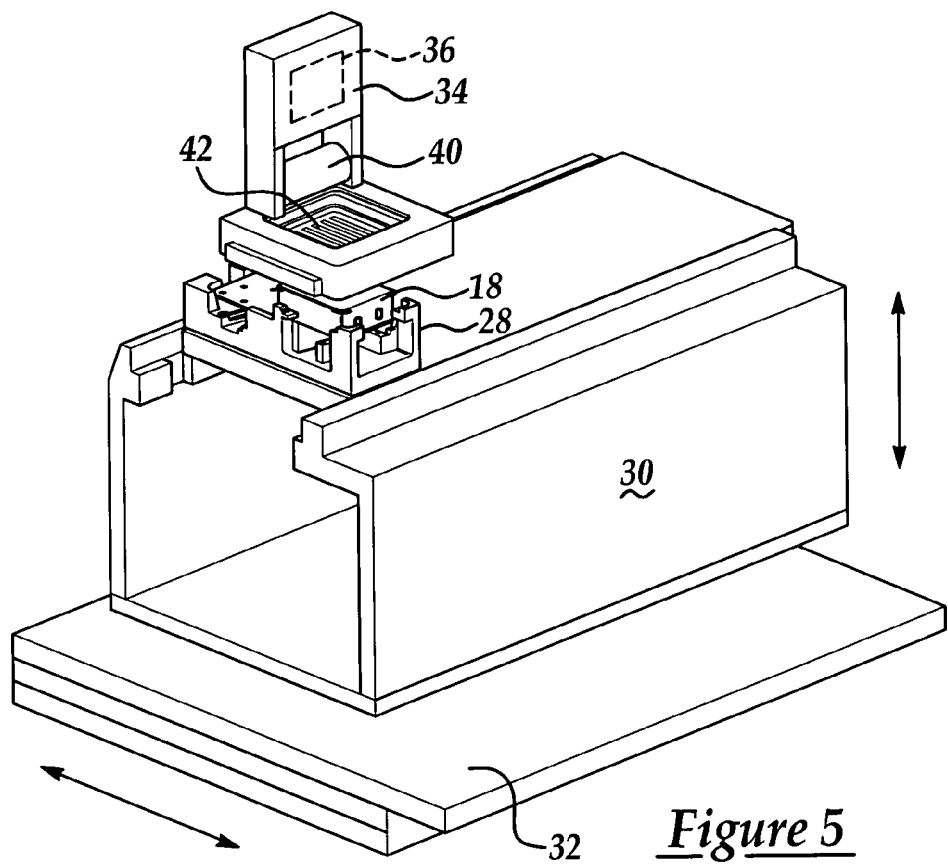
FIG. 5 is a semi-schematic perspective view of the embodiment of FIG. 2, and showing a workpiece lift fixture and translating member.

FIG. 3 is a semi-schematic perspective view, showing the laser welding system of FIG. 2. Referring now to FIGS. 4 and 5 together, a semi-schematic perspective view of laser welding system 100 is shown, also depicting two banks 44 each having a plurality of laser diodes 14 therein (15 in each bank 44, as shown, though it is to be understood that any suitable number of diodes 14 may be in each bank 44, and any suitable number of banks 44 may be used, as desired for a particular application). Laser welding system 100 also includes a plurality of fiber bundles 48, each connected to a laser diode 14 via fiber bundle connector 46 (only two bundles 48 and associated connectors 46 are shown for clarity). The workpiece positioning member 28, translating member 32 and/or lift fixture 30 are operatively connected to servo motor 50 and drive screw 52 in order to position workpiece 18 as desired for suitable laser scanning. FIG. 5 is a semi-schematic perspective view showing laser welding system 100 in conjunction with lift fixture 30, translating member 32 and positioning member 28. Laser head 34, laser fiber bundle(s) 36, lens 40 and water cooled pressure plate 42 are also shown.

Figure 6:
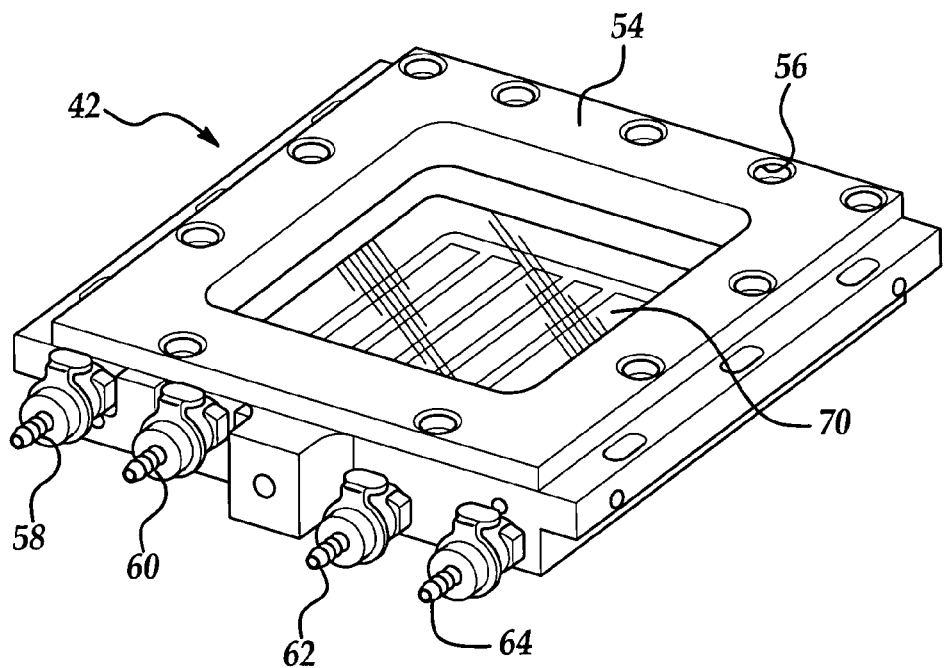
FIG. 6 is an enlarged perspective view of a water cooled masked pressure plate.
Figure 7:
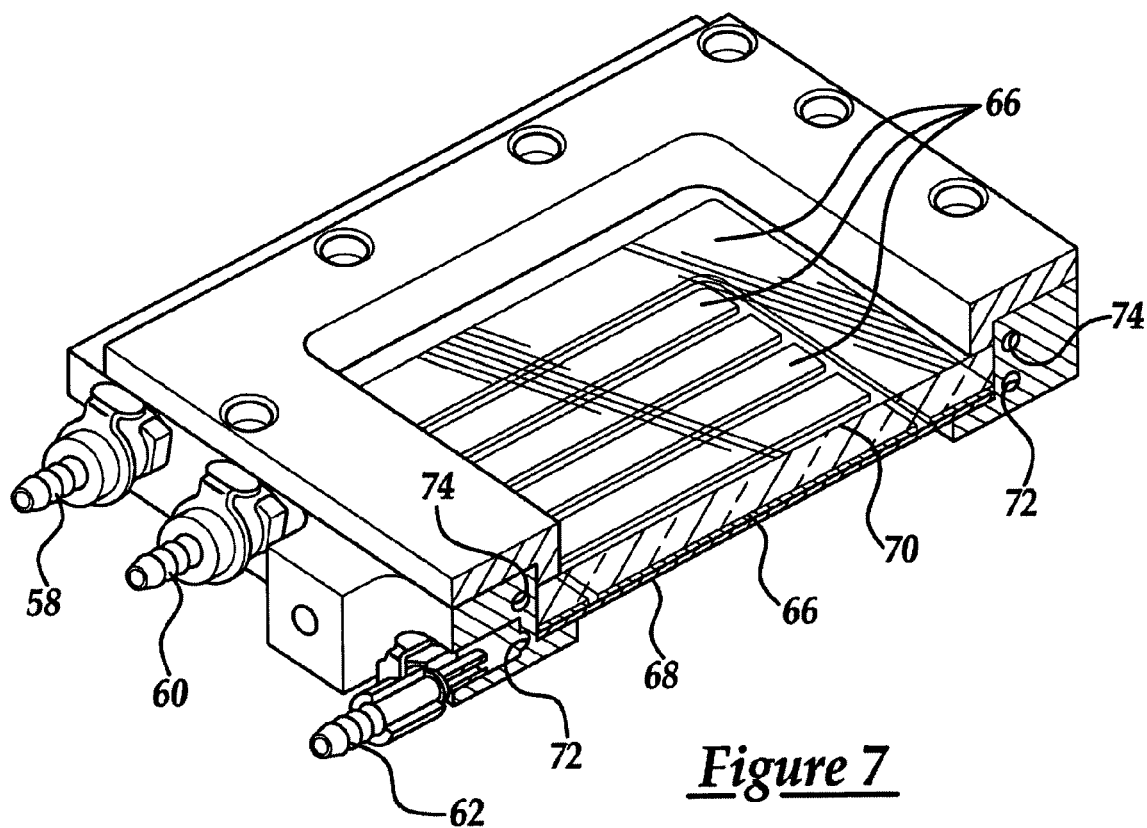
FIG. 7 is a cross sectional view of the water cooled masked pressure plate of FIG. 6.

Referring now to FIGS. 6 and 7 together, in an embodiment, the water cooled pressure plate 42 includes a frame having an interior opening therethrough and at least one water cooling passage 72, 74 within an outer periphery of the frame. It is to be understood that the frame may be formed from any suitable material and in any suitable size, shape and/or configuration. In an embodiment, the frame is formed from one or more layers of aluminum, copper, other suitably highly conductive metals, alloys thereof, and/or combinations thereof.

As shown in FIGS. 6 and 7, an embodiment of the frame has an upper member 54 attachable to a lower member via mounting throughbores 56; and the cooling passages 72, 74 are in the lower frame member. A first layer 68 of a substantially highly transmissive material is supported by the frame and substantially covers the interior opening, as shown. It is to be understood that "highly transmissive" or "substantially highly transmissive" as defined herein is meant to mean a material which transmits more than about 85% of the light incident upon it. Some examples of highly transmissive materials include, but are not limited to quartz, glass, clear plastics (examples of which include polycarbonate, acrylic, and/or combinations thereof), and/or combinations thereof.

A mask 66 is established in a predetermined configuration on the first layer 68 of transmissive material. It is to be understood that mask 66 may be formed of any suitable material, of any suitable thickness, and established by any suitable means, for example, by any suitable deposition techniques. In an embodiment, mask 66 ranges in thickness from about 1 micron to about 50 microns. In a further embodiment, mask 66 has a thickness of about 5 microns. It is to be understood that mask 66 may be formed of any suitable substantially non-transmissive, highly reflective material. As used herein, "highly reflective" is meant to mean a material which reflects at least 90% of the light incident upon it. Examples of such materials include, but are not limited to gold, chrome, highly polished aluminum, highly polished silver, and/or combinations thereof. The term "highly polished" is intended to mean that the material has a mirror finish. In an embodiment, the mask 66 material is gold. In a further embodiment, a layer of silver (to aid in adhesion of the gold layer) is established between the layer of gold and the first transmissive layer 68 to form mask 66.

A second layer 70 of a substantially highly transmissive material, for example quartz, may be supported by the frame and established on the mask 66/first layer 68, if desired. Second layer 70 may advantageously substantially prevent some wear of plate 42.

In an embodiment, the first 68 and second 70 layers are formed from quartz.

It is to be understood that layers 68 and 70 may be of any suitable thickness. In an embodiment, the first layer 68 of highly transmissive material ranges in thickness between about 0.1 mm and about 2.0 mm; and the second layer 70 of highly transmissive material ranges in thickness between about 3.0 mm and about 20.0 mm.

In an embodiment, the water is optionally pre-cooled before entering upper cooling water inlet 58 and/or lower cooling water inlet 64 (if more than one cooling passage is utilized). The water/chilled water (if chilled water is used) is adapted to circulate through the water cooling passage(s) 72 and/or 74, and through outlet(s) 60 and/or 62, respectively, thereby removing heat from the pressure plate 42. If chilled water is used, it may be cooled to any suitable temperature; and in an embodiment, the water is cooled to a temperature ranging between about 12° C. and about 18° C.

In an embodiment using both the upper 74 and lower 72 water cooling passages, the upper water cooling passage 74 is adapted to remove heat generated substantially in an upper region of the pressure plate 42 by absorption by the mask 66. The lower water cooling passage 72 is adapted to remove heat generated substantially in a lower region of the pressure plate 42 by contact with the workpiece 18.

A method according to the embodiment(s) herein includes lifting the first component 20 and the other component 22 against a pressure plate 26, 42; and holding the components 20, 22 together under a predetermined pressure while the workpiece positioning 28 and translating member 32 has the workpiece 18 scanned by substantially continuously placing consecutive adjacent areas of the workpiece 18 to be welded a predetermined distance from the laser head 12 or 34 for a predetermined period of time, whereby the workpiece 18 is scanned by the continuous line of laser energy L or the substantially straight line array of laser energy 38. It is to be understood that any suitable pressure may be used as desired and depending upon the particular application. In an embodiment, the pressure may range between about 30 psi and about 90 psi. In a further embodiment, the pressure is about 60 psi.

The method further includes partially melting and bonding the first component 20 and the other component 22 at a weld interface 21 therebetween through heat produced by the continuous line of laser energy L or the substantially straight line array of laser energy 38.

It is to be understood that workpiece 18 may be scanned one or multiple times, as desired or depending upon the particular materials used for components 20, 22 and/or depending upon the particular application. Scanning the workpiece 18 more than once may, in some instances, substantially improve uniformity of adhesion strength at the weld interface 21.

A method of using the laser welding system 10, 100 includes setting the laser head 12, 34 to a predetermined beam divergence, output power, operating current, and/or temperature. The rate of overlap o between adjacent laser beam segments 1 (embodiment of FIG. 1) and/or energy density may be adjusted by varying the distance between the workpiece 18 and the laser head 12, 34. The workpiece 18 may then be scanned as discussed above.

Figure 8:
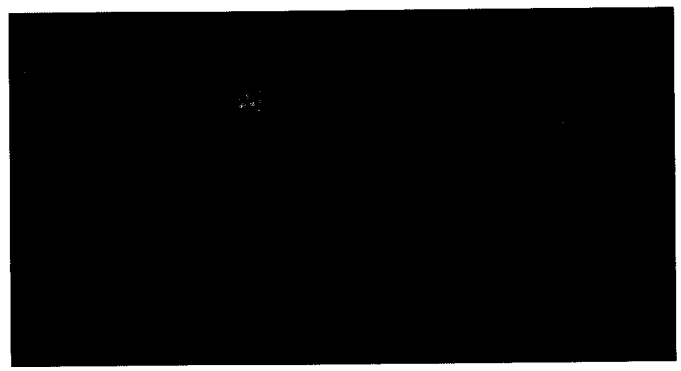
FIG. 8 is an image of two continuous lines of laser energy of varying width generated by the embodiment of FIG. 1.

FIG. 8 shows two images of varying width of the continuous line of laser energy L of the embodiment of FIG. 1. As may be gleaned from the disclosure herein, the continuity of the line L may be varied, if desired, by adjusting the amount of overlap o between adjacent line segments 1. The line L or substantially straight line of laser energy 38 may be varied to any suitable length and/or width. In an embodiment, the line L, 38 dimension is about 8.6 cm (3.4 inches) (length) by about 0.25 cm (0.1 inches) (thickness of line L, 38) at the workpiece 18 (for example, at interface 21).

It is to be understood that embodiment(s) of the present disclosure may have many advantages, including but not limited to those mentioned herein.

While several embodiments have been described in detail, it will be apparent to those skilled in the art that the disclosed embodiments may be modified. Therefore, the foregoing description is to be considered exemplary rather than limiting.

What is claimed is:

1. A laser welding system, comprising:
   a free-spacing beam delivery laser head having a linear array of at least two laser diodes therein, each of the diodes adapted to generate a laser beam, the laser beams adapted to weld a workpiece having a first component and at least one other component to be welded to the first component;
   a lens spaced from each of the at least two laser diodes, each of the lenses adapted to focus the respective laser beam into a focused laser beam segment thus forming a continuous line of laser energy; and
   a water cooled pressure plate between the lenses and the first component of the workpiece, the water cooled pressure plate including a frame having an interior opening and at least one water cooling passage within an outer periphery of the frame,
   wherein the water cooled pressure plate further comprises:
   a first layer of substantially transmissive material supported by the frame and substantially covering the interior opening;
   a mask established in a predetermined configuration on the first layer of substantially transmissive material; and
   a second layer of substantially transmissive material supported by the frame and established on the mask,
   wherein the mask comprises a substantially non-transmissive, highly reflective material.

2. The laser welding system as defined in claim 1 wherein the linear array includes six laser diodes comprising a substantially horizontal 1×6 laser diode stack.

3. The laser welding system as defined in claim 1 wherein the continuous line of laser energy is in a plane containing an interface between the first component and the at least one other component.

4. The laser welding system as defined in claim 1 wherein each lens is a cylindrical focusing lens adapted to adjust the respective laser beam density and reduce beam divergence.

5. The laser welding system as defined in claim 1, further comprising a workpiece positioning and translating member adapted to substantially continuously place consecutive adjacent areas of the workpiece to be welded a predetermined distance from the laser head for a predetermined period of time.

6. The laser welding system as defined in claim 1 wherein the continuous line of laser energy has a wavelength of about 808 nm CW and a spectral width less than about 7 nm.

7. The laser welding system as defined in claim 6 wherein the spectral width ranges from about 5 nm to about 7 nm.

8. The laser welding system as defined in claim 1 wherein the first component and the at least one other component are each formed from at least one polymeric material.

9. The laser welding system as defined in claim 1 wherein the continuous line of laser energy has a range of transmission and absorption ranging between about 780 nm and about 840 nm.

10. The laser welding system as defined in claim 1, further comprising a predetermined amount of overlap between each of adjacent laser beam segments.

11. The laser welding system as defined in claim 1 wherein the non-transmissive, highly reflective material is a layer of gold.

12. The laser welding system as defined in claim 11 wherein the frame is formed from aluminum, and wherein a layer of silver is established between the layer of gold and the first transmissive layer.

13. The laser welding system as defined in claim 1, wherein chilled water is adapted to circulate through the at least one water cooling passage, thereby removing heat from the pressure plate.

14. The laser welding system as defined in claim 1 wherein the at least one water cooling passage comprises:
   an upper water cooling passage adapted to remove heat generated substantially in an upper region of the pressure plate by absorption by the mask; and
   a lower water cooling passage adapted to remove heat generated substantially in a lower region of the pressure plate by contact with the workpiece.

* * * * *